United States Patent [19]
Yokose et al.

[11] Patent Number: 5,699,170
[45] Date of Patent: Dec. 16, 1997

[54] IMAGE COMMUNICATION SYSTEM INCLUDING RECEIVER IMAGE DATA SELECTION CAPABILITY

[75] Inventors: Taro Yokose; Koh Kamizawa, both of Ebina, Japan

[73] Assignee: Fuji Xerox Co., Ltd., Tokyo, Japan

[21] Appl. No.: 688,968

[22] Filed: Jul. 31, 1996

Related U.S. Application Data

[63] Continuation of Ser. No. 294,935, Aug. 23, 1994.

[30] Foreign Application Priority Data

Aug. 24, 1993 [JP] Japan .................. 5-209672

[51] Int. Cl.$^6$ .................................................. H04N 1/32
[52] U.S. Cl. .................................. 358/426; 358/434
[58] Field of Search .............................. 358/426, 407, 358/447, 451, 433–435

[56] References Cited

U.S. PATENT DOCUMENTS

| | | | |
|---|---|---|---|
| 5,048,111 | 9/1991 | Jones et al. | 358/426 |
| 5,050,230 | 9/1991 | Jones et al. | 358/426 |
| 5,282,255 | 1/1994 | Bovik et al. | 358/433 |
| 5,392,133 | 2/1995 | Nakajima | 358/407 |

FOREIGN PATENT DOCUMENTS

| | | |
|---|---|---|
| 3-91370 | 4/1991 | Japan. |
| 4-181859 | 6/1992 | Japan. |

*Primary Examiner*—Edward L. Coles, Sr.
*Assistant Examiner*—Stephen Brinich
*Attorney, Agent, or Firm*—Finnegan, Henderson, Farabow, Garrett & Dunner, L.L.P.

[57] ABSTRACT

An image communication system wherein transmission of an image between an image transmission apparatus and an image reception apparatus which include image output sections having different performances can be performed without making an inquiry for the performance prior to transmission is disclosed. An image is inputted by an image input section and sent to a hierarchization section in the image transmission apparatus. The hierarchization section converts the inputted image into and transmits hierarchized data to a selection section of the image reception apparatus. The selection section extracts only necessary ones of the data transmitted thereto in accordance with the performance of an image output section of the image reception section and then sends the necessary data to the image output section after, if necessary, they are converted into image data. The image output section visualize the image data transmitted thereto from the selection section.

4 Claims, 13 Drawing Sheets

| ITEM | CONTENTS |
|---|---|
| CODING TECHNIQUE | JPEG HIERARCHICAL |
| RESOLUTION | 400 [dpi] |
| INTERLEAVE | COMPONENTS |
| USED COLORS | FULL COLORS |
| COLOR SPACE | L*a*b* |
| ⋮ | ⋮ |

| TYPE | BYTE NUMBER FROM TOP [ byte ] |
|---|---|
| 100 dpi/A COMPONENT | 0 |
| 200 dpi/A COMPONENT | 100 |
| 400 dpi/A COMPONENT | 300 |
| 100 dpi/B COMPONENT | 700 |
| ⋮ | ⋮ |

| r [dpi] CODES | 2r [dpi] CODES | 4r [dpi] CODES | 8r [dpi] CODES | ..... |

| r [dpi] CODES | 2r [dpi] CODES | 3r [dpi] CODES | 3.6r [dpi] CODES | ..... |

| LOW FREQUENCY COMPONENT CODES | MEDIUM FREQUENCY COMPONENT CODES | HIGH FREQUENCY COMPONENT CODES | ..... |

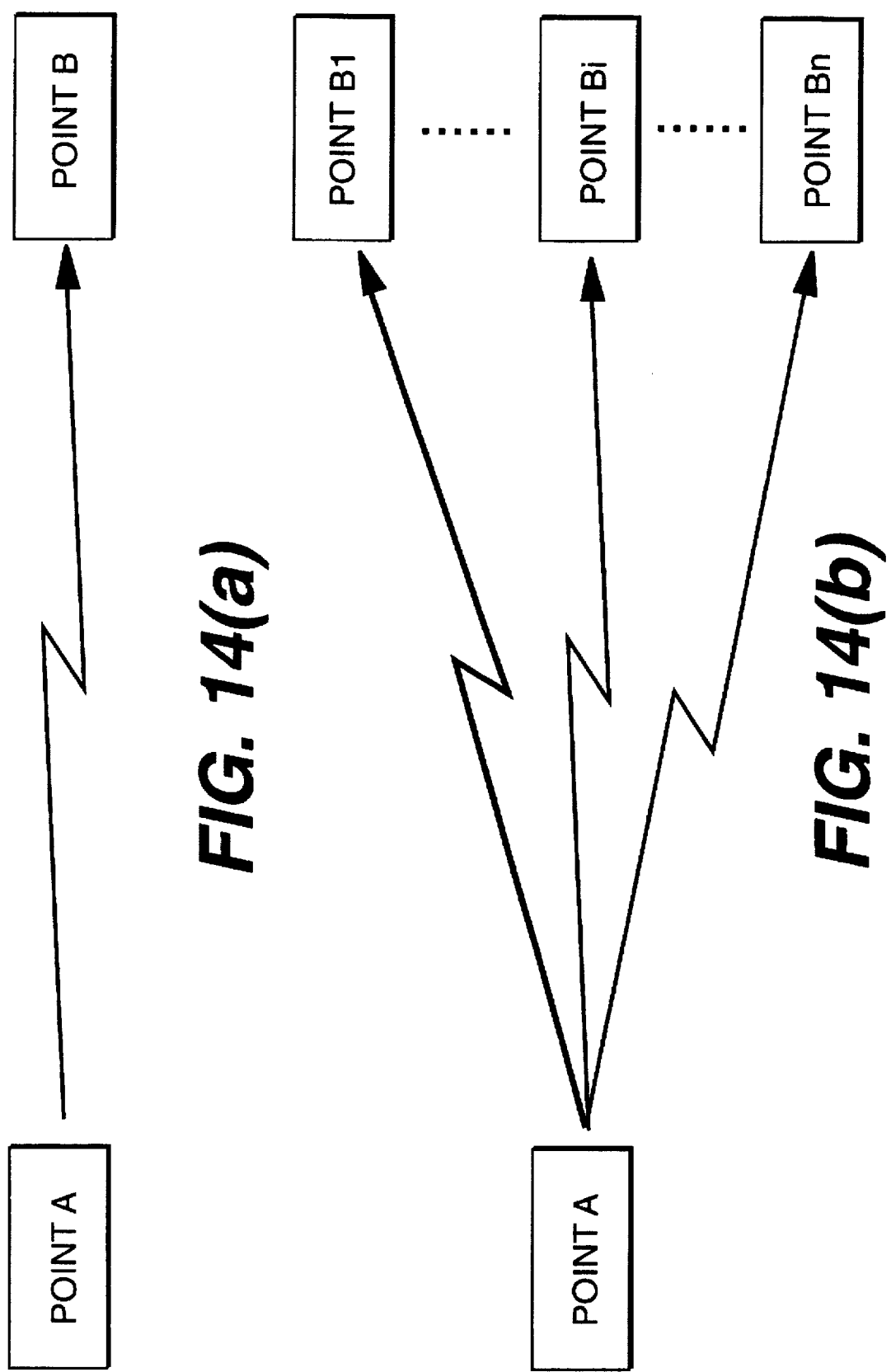

IMAGE COMMUNICATION SYSTEM INCLUDING RECEIVER IMAGE DATA SELECTION CAPABILITY

This application is a continuation of application Ser. No. 08/294,935, filed Aug. 23, 1994.

BACKGROUND OF THE INVENTION

1. Field of the Invention

This invention relates to an image communication system such as a facsimile, and more particularly to communications between image communication systems which include image output means having different performances.

2. Description of the Related Art

Conventionally, standards such as the G3 and G4 standards have been specified for facsimiles by the CCITT. Those standards have been all directed to black-and-white images. Meanwhile, various facsimiles which can transmit color images have been proposed. Also a facsimile having a different resolution from those of conventional facsimiles has been proposed which is constituted from a printer provided with facsimile functions with a communication function thereto. In this manner, facsimiles exhibit a phase of diversification in terms of the type of an object image.

When the character of facsimiles from the point of view of general communications in which a public network is employed is considered, the necessity for communications between facsimiles designed for images of different characters is high. However, a color facsimile or a facsimile which has a different resolution has a problem in mismatch of data in communication with a conventional black-and-white facsimile.

Several means for solving the problem have been proposed. The conventionally proposed means premise that the transmission side first makes an inquiry to the reception side for a function of the reception side and modifies transmission data in accordance with information of the function from the reception side. Such inquiry before transmission will be hereinafter referred to as negotiation. Information particularly of functions of an output resolution, a number of colors used, a coding method used and so forth makes an object for the negotiation. Information with which it is determined whether or not code data can be decoded and whether or not image data can be visualized by a particular image reception apparatus will be hereinafter referred to as a code attribute and an image attribute, respectively. Naturally, the wording "attributes" denotes both of the code attribute and the image attribute.

As examples of image transmission which employs the negotiation, a method of changing over between color and black-and-white displays is disclosed in Japanese Patent Laid-Open No. Hei 3-91370, and a method of changing over the resolution and so forth is disclosed in Japanese Patent Laid-Open No. Hei 4-181859.

On the other hand, as means which does not make use of the negotiation, there possibly is a system wherein an attribute is added as additional information to communication data and necessary image processing such as resolution conversion is performed on the reception side. In this system, communication can be performed between different apparatus having different attributes if the reception side apparatus is capable of performing image conversion processing in accordance with performances of the equipment thereof.

In the following, examples of a system wherein negotiations are performed and another system wherein image conversion processing is performed on the reception side as well as disadvantages of them will be described.

First, a system wherein negotiations are performed will be described. FIG. 12 shows a schematic construction of a facsimile system which performs negotiations. The facsimile system shown includes an image transmission apparatus 1110 and an image reception apparatus 1120. The image transmission apparatus 1110 includes an image input section 1, a color/resolution conversion section 210, a coding section 220, and a transmission section 50. The image reception apparatus 1120 includes a reception section 60, a decoding section 230, and an image output section 4. In FIG. 12, reference numeral 5 denotes input image data, 310 control parameter or parameters, 320 converted image data, reference numerals 330 and 350 denote code data, reference numeral 340 denotes communication data, and 7 output image data.

In the image transmission apparatus 1110, the image input section 1 reads and converts an image of an input original document into input image data 5 and sends out the input image data 5 to the color/resolution conversion section 210. The color/resolution conversion section 210 processes the input image data 110 by color/resolution conversion processing in accordance with control parameters 310 and sends out thus converted image data 320 to the coding section 220. The coding section 220 performs coding processing of the converted image data 320 and sends out resulted data as code data 330 to the transmission section 50. The transmission section 50 performs negotiations with the reception section 60 of the image reception apparatus 1120 by way of communication data 340, converts information obtained by the negotiations into control parameters 310, and sends out the control parameters 310 to the color/resolution conversion section 210. The transmission section 50 further converts the code data 330 into communication data 340 and transmits the communication data 340 to the reception section 60 of the image reception apparatus 1120.

In the image reception apparatus 1120, the reception section 60 converts the received communication data 340 into code data 350 and sends out the code data 350 to the decoding section 230. The decoding section 230 decodes the code data 350 into the output image data 7 and sends out output image data 7 to the image output section 4. The image output section 4 receives the output image data 7 and performs visualization of the output image data 7 into an output image using a recording apparatus such as a printer or a display unit.

Operation of the facsimile system having the construction described above will be described. Referring to FIG. 13(a) which illustrates operation of the image transmission apparatus 1110 of FIG. 12, the image input section 1 performs an image inputting operation at step S10. The image input section 1 converts the inputted image into input image data 5 and sends out the input image data 5 to the color/resolution conversion section 210. At step S210, the transmission section 10 performs negotiations with the reception section 60 of the image reception apparatus 1120 by way of communication data 340 to obtain information regarding the attributes of the image reception apparatus 1120. At step S220, the code attribute of the decoding section 230 of the image reception apparatus 1120 is tested to discriminate whether or not corresponding coding is possible. If coding is impossible, the transmission processing is ended. Else, at step S230, the transmission section 50 converts the attribute data obtained by way of the negotiations into control parameters 310 and sends out the control parameters 310 to the color/resolution conversion section 210. At step S240, the color/resolution conversion section 210 performs color/resolution conversion processing of the input image data 5 and sends out resulted converted image data 320 to the coding section 220. In this instance, the conversion processing is performed so that decoding and visualization of the image data into an image can be performed in accordance with the control parameters 310 by the image reception apparatus 1120. At step S250, the coding section 220 performs coding processing of the converted image data 320 and sends out resulted data as code data 330 to the transmission section 50. At step S50, the transmission section 50 converts the code data 330 into communication data 340 and transmits the communication data 340 to the reception section 60 of the image reception apparatus 1120.

Referring now to FIG. 13(b) which illustrates operation of the image reception apparatus 1120 of FIG. 12, the reception section 60 receives the communication data 340 from the image transmission apparatus 1110, converts the received communication data 340 into code data 350 and sends out the code data 350 to the decoding section 230 at step S60. Then at step S260, the decoding section 230 decodes the code data 350 into output image data 7 and sends out the output image data 7 to the image output section 4. At step S110, the image output section 4 receives the output image data 7 and performs visualization into an output image in accordance with the received the output image data 7 using a recording apparatus such as a printer or a display unit. In this instance, such visualization can be performed without any trouble since the attributes of the output image have already been converted by the image transmission apparatus 1110 to those which allow visualization of the output image by the image output section 4.

The technique can be performed for such communications between two points as illustrated in FIG. 14(a) on the standards such as the G4 standards in which negotiations are included in the protocol. However, since the complexity of negotiations increases in proportion to the number of kinds of attributes, there is a problem in that, as the number of functions of a facsimile increases, also the negotiations are complicated as much. Further, this technique cannot be used as it is for communications on a protocol for which negotiations are not premised. Further, in such broadcasting communications wherein communications are performed from a single point at a time to a plurality of points as seen in FIG. 14(b), the overhead of negotiations increases accordingly. When, for example, communications to n points are considered, while only one operation for transmission is required between facsimiles having same functions, the technique described above requires n negotiations and n operations for transmission of image data. In this instance, a heavy burden is applied to the transmission side and much time is required. Consequently, the technique is not very practical in actual use.

Subsequently, the second system wherein image conversion processing is performed on the reception side will be described. FIG. 15 shows an exemplary construction of a facsimile system wherein image conversion processing is performed on the reception side. Referring to FIG. 15, the facsimile system shown includes an image transmission apparatus 1210 and an image reception apparatus 1220. The image transmission apparatus 1210 includes an image input section 1, an attribute data production section 30, a data integration section 40, a transmission section 50 and a coding section 220. Meanwhile, the image reception apparatus 1220 includes a reception section 60, a data disintegration section 70, an attribute data decoding section 80, a decoding section 230, a color/resolution conversion section 210, and an image output section 4. It is to be noted that, in FIG. 15, each of reference numerals 510 and 570 denotes code data, each of 130 and 550 denotes attribute data, reference numeral 520 denotes transmission data, 530 communication data, 540 reception data, 560 control parameters, and 580 decoded image data.

In the image transmission apparatus 1210, the image input section 1 reads and converts an image of an input original document into input image data 5 and sends out the input image data 5 to the coding section 220. The coding section 220 processes the input image data 5 by coding processing and sends out a result of the coding processing as code data 510 to the data integration section 40. The attribute data production section 30 produces attribute data 130 in accordance with the input image and the coding method and sends out the attribute data 130 to the data integration section 40. The data integration section 40 integrates the code data 510 and the attribute data 130 to produce transmission data 520 and sends out the transmission data 520 to the transmission section 50. The transmission section 50 converts the transmission data 520 into communication data 530 and transmits the communication data 530 to the reception section 60 of the image reception apparatus 1220.

In the image reception apparatus 1220, the reception section 60 receives and converts the communication data 530 into reception data 540 and sends out the reception data 540 to the data disintegration section 70. The data disintegration section 70 disintegrates the reception data 540 to produce code data 570 and attribute data 550 and sends them out to the decoding section 230 and the attribute data decoding section 80, respectively. The attribute data decoding section 80 converts the attribute data 550 into control parameters 560 and sends out the control parameters 560 to the color/resolution conversion section 210 and simultaneously discriminates the possibility of decoding from the code attribute of the code data 330. The decoding section 230 decodes the code data 570 into decoded image data 580 and sends the decoded image data 580 to the color/resolution conversion section 210. The color/resolution conversion section 210 processes the decoded image data 580 by color/resolution conversion processing in accordance with the control parameters 560 and sends out a result of the color/resolution conversion processing as output image data 7 to the image output section 4. The image output section 4 receives the output image data 7 and performs visualization of the output image data 7 into an output image using a recording apparatus such as a printer or a display unit.

FIG. 16(a) illustrates operation of the image transmission apparatus 1210 shown in FIG. 15. Referring to FIG. 16(a), in operation of the image transmission apparatus 1210, the image input section 1 performs an image inputting operation at step S10. The image input section 1 converts the inputted image into input image data 5 and sends out the input image data 5 to the coding section 220. At step S20, the attribute data production section 30 produces attribute data 130 and sends out them to the data integration section 40. At step S240, the coding section 220 performs coding processing of the input image data 5 and sends out a result of the coding processing as code data 510 to the data integration section 40. At step S40, the data integration section 40 integrates the attribute data 130 and the code data 510 with each other to produce transmission data 520 and sends out the transmission data 520 to the transmission section 50. At step S50, the transmission section 50 converts the transmission data 520 into communication data 340 and transmits the communication data 340 to the reception section 60 of the image reception apparatus 1220.

FIG. 16(b) illustrates operation of the image reception apparatus 1220 shown in FIG. 15. Referring to FIG. 16(b), in operation of the image reception apparatus 1220, the reception section 60 receives the communication data 340 from the image transmission apparatus 1210, converts the received communication data 340 into reception data 540 and sends out the reception data 540 to the data disintegration section 70 at step S60. At step S70, the data disintegration section 70 disintegrates the reception data 540 into attribute data 550 and code data 570 and sends out the attribute data 550 and the code data 570 to the attribute data decoding section 80 and the decoding section 230, respectively. At step S80, the attribute data decoding section 80 produces control parameters 560 from the attribute data 550 and sends out the control parameters 560 to the color/resolution conversion section 210. At step S250, the attribute data decoding section 80 refers to the code attribute of the attribute data 550 to discriminate the possibility of decoding by the decoding section 230. If it is discriminated that decoding is impossible, then the reception processing is ended. Else, at step S260, the decoding section 230 decodes the code data 570 into decoded image data 580 and sends out the decoded image data 580 to the color/resolution conversion section 210. At step S230, the color/resolution conversion section 210 processes the decoded image data 580 by color/resolution conversion processing and sends out a result of the processing as output image data 7 to the image output section 4. In this instance, the conversion processing is performed so that visualization of the image data into an image can be performed in accordance with the control parameters 560 by the image output section 4. At step S110, the image output section 4 receives the output image data 7 and performs visualization of the output image data 7 into an output image using a recording apparatus such as a printer or a display unit.

It is to be noted that the system in which attribute data are transmitted requires coincidence between the coding techniques of the coding section of the image transmission apparatus and the decoding section of the image reception apparatus. It seems a possible idea to provide, in order to moderate the requirement described just above, a plurality of decoding sections having different coding techniques in the image reception apparatus and notify the image reception apparatus of the coding technique of the image transmission apparatus making use of code attribute data or some other information so that the decoding algorithm of the image reception apparatus is changed over adaptively. This possible improvement allows decoding only if one of the decoding sections of the image reception apparatus matches with the coding technique of the image transmission apparatus.

This technique, however, seems disadvantageous in that the reception side apparatus must be equipped with conversion processing sections for the color space or the resolution. Consequently, for communications from a color facsimile to a black-and-white/limited color facsimile, the black-and-white/limited color facsimile must include frame memories for full colors or color conversion sections, which are originally unnecessary. Also for communications from a high resolution facsimile to a low resolution facsimile, a large capacity memory for a high resolution or a resolution conversion section, which is originally unnecessary, is required on the low resolution facsimile side.

In summary, conventional image transmission between facsimiles having different attributes involves the following problems.

1. Where negotiations are performed:
   The complexity of negotiations depends upon the diversity of attributes.
   Negotiations are possible only on a presumed protocol.
   The burden to the transmission side is heavy in broadcasting communications.
2. Where image conversion processing is performed on the reception side:
   An image conversion processing section which is originally unnecessary must be provided on the reception side.

SUMMARY OF THE INVENTION

It is an object of the present invention to provide a facsimile apparatus of a simple construction which can communicate with another facsimile having any presumable function using same information irrespective of functions of the facsimile on the reception side.

In order to attain the object described above, according to an aspect of the present invention, there is provided an image communication system, which comprises an image transmission apparatus including an image input section for inputting an image and a hierarchization section for producing hierarchic communication data from the image inputted from the image input section and transmitting the hierarchic communication data, and an image reception apparatus including a selection section for selecting only necessary data from the hierarchic communication data transmitted thereto from the image transmission apparatus to produce output data and an image output section for visualizing the output data produced by the selection section into a visible image.

According to another aspect of the present invention, there is provided an image communication system, which comprises a transmission apparatus for transmitting an image inputted thereto as image data, and a reception apparatus including image output means for receiving the image data transmitted thereto from the transmission apparatus and outputting the received image data as an image, the transmission apparatus including image input means for inputting an image and hierarchization means for performing hierarchization of the image inputted thereto from the image input means and transmitting the thus hierarchized image to the reception apparatus, the reception apparatus further including selection means for selecting data transmitted thereto from the hierarchization means of the transmission apparatus in accordance with a performance of the image output means, the hierarchization means performing predetermined hierarchization for image data so that only those data which can be outputted by the image output means may be selected by the selection means.

According to a further aspect of the present invention, there is provided an image communication system, which comprises an image input section for inputting image data, means for extracting, from the image data inputted thereto from the image input section, a plurality of image data different in terms of an attribute, which should be matched for communication, to produce particular image data, storage means for storing the individual particular image data, storage control means for causing the individual particular image data to be stored to predetermined locations of the storage means, attribute data production means for producing, from the storage locations of the individual particular image data in the storage means, attribute data of the particular image data, means for integrating the particular image data of the storage means and the attribute data produced by the attribute data production means, and transmission means for transmitting the integration data obtained from the integrating means.

According to a still further aspect of the present invention, there is provided an image communication system wherein communication data of transmission side means are transmitted to reception side means by way of a communication circuit, the transmission side means including an image input section for inputting image data, means for extracting, from the image data inputted thereto from the image input section, a plurality of image data different in terms of an attribute, which should be matched for communication, to produce particular image data, storage means for storing the individual particular image data, storage control means for causing the individual particular image data to be stored to predetermined locations of the storage means, attribute data production means for producing, from the storage locations of the individual particular image data in the storage means, attribute data of the particular image data, means for integrating the particular image data of the storage means and the attribute data produced by the attribute data production means, and transmission means for transmitting the integration data obtained from the integrating means, the reception side means including reception means for receiving the communication data transmitted thereto from the transmission side means, means for disintegrating the communication data received by the reception means into the attribute data and the particular image data, means for selecting a predetermined one or ones of the particular image data in accordance with the attribute data disintegrated by the disintegrating means, and means for outputting the particular image data selected by the selection means.

According to a yet further aspect of the present invention, there is provided an image communication system, which comprises reception side means for receiving communication data transmitted thereto from transmission side means by way of a communication circuit, the reception side means including reception means for receiving the communication data transmitted thereto from the transmission side means, the communication data including particular image data and attribute data representative of the particular image data, means for disintegrating the communication data received by the reception means into the attribute data and the particular image data, means for selecting a predetermined one or ones of the particular image data in accordance with the attribute data disintegrated by the disintegrating means, and means for outputting the particular image data selected by the selection means.

In the image communication systems of the present invention, since communication data are hierarchized, the image reception apparatus can readily select only necessary ones of the image data transmitted thereto in accordance with the function thereof. Accordingly, the image reception apparatus does not require image conversion processing which is originally unnecessary with the image reception apparatus. Further, the image reception apparatus need not perform reception or conversion into output data of any data component which exceeds the performance of the image output section or means thereof.

Consequently, the transmission side apparatus or means need not know of performances of the reception side apparatus or means, and accordingly, negotiations before data transmission are unnecessary, which simplifies processing of the transmission side apparatus or means.

Further, when it is intended to transmit a same image to a plurality of image reception apparatus, since negotiations are not necessary, data which can be outputted from any kind of image reception apparatus presumable on the image transmission side apparatus can be transmitted by outputting same data only once. Consequently, the transmission processing of the transmission side apparatus or means is simplified, and the transmission time is reduced.

Furthermore, the image reception apparatus or means can readily discriminate necessary data from data transmitted thereto using attribute data in accordance with the performance of the image output section thereof and can select only the necessary data in accordance with the discrimination. Consequently, higher speed reception processing, simplification of the image reception apparatus and reduction of the communication time can be achieved.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 14(a) and 14(b) are diagrammatic views illustrating different forms of communications;

DETAILED DESCRIPTION OF THE PREFERRED EMBODIMENTS

Figure 1:
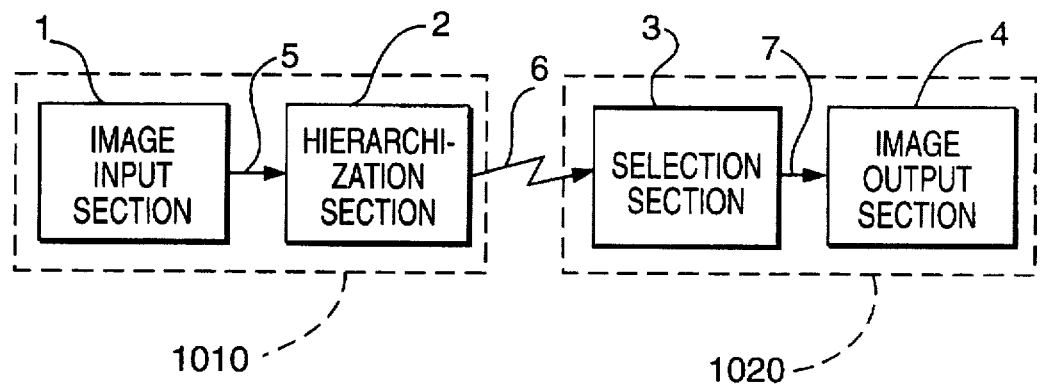
FIG. 1 is a block diagram illustrating a concept of an image communication system of the present invention.

Referring first to FIG. 1, there is illustrated in block diagram a concept of an image communication system of the present invention. The image communication system shown includes an image transmission apparatus 1010 and an image reception apparatus 1020. The image transmission apparatus 1010 includes an image input section 1 and a hierarchization section 2 while the image reception apparatus 1020 includes a selection section 3 and an image output section 4. It is to be noted that, in FIG. 1, reference numeral 5 denotes input image data, and 6 communication data.

In the image transmission apparatus 1010, the image input section 1 receives an input image and sends it out as input image data 5 to the hierarchization section 2. The hierarchization section 2 converts the input image data 5 into hierarchized communication data 6 and transmits the hierarchized communication data 6 to the selection section 3 of the image reception apparatus 1020.

In the image reception apparatus 1020, the selection section 3 selects only necessary components from the communication data 6, converts the selected components into output image data 7, and sends out the output image data 7 to the image output section 4. The image output section 4 thus performs visualization of the output image data 7.

It is to be noted that hierarchization here signifies that the image transmission apparatus 1010 disintegrates and processes an image and code data so that the image reception apparatus 1020 may select only necessary data to effect outputting of an image without any image conversion processing which is originally unnecessary.

When coding is performed for compression of communication data as a presumption in the present invention, it is assumed that the coding technique of the image transmission apparatus and the decoding technique of the image reception apparatus match with each other. Or, it is assumed that the image reception apparatus includes a plurality of decoding sections, at least one of which matches with the coding technique of the image transmission apparatus, and the coding method for data to be communicated is notified to the image reception apparatus.

Figure 2:
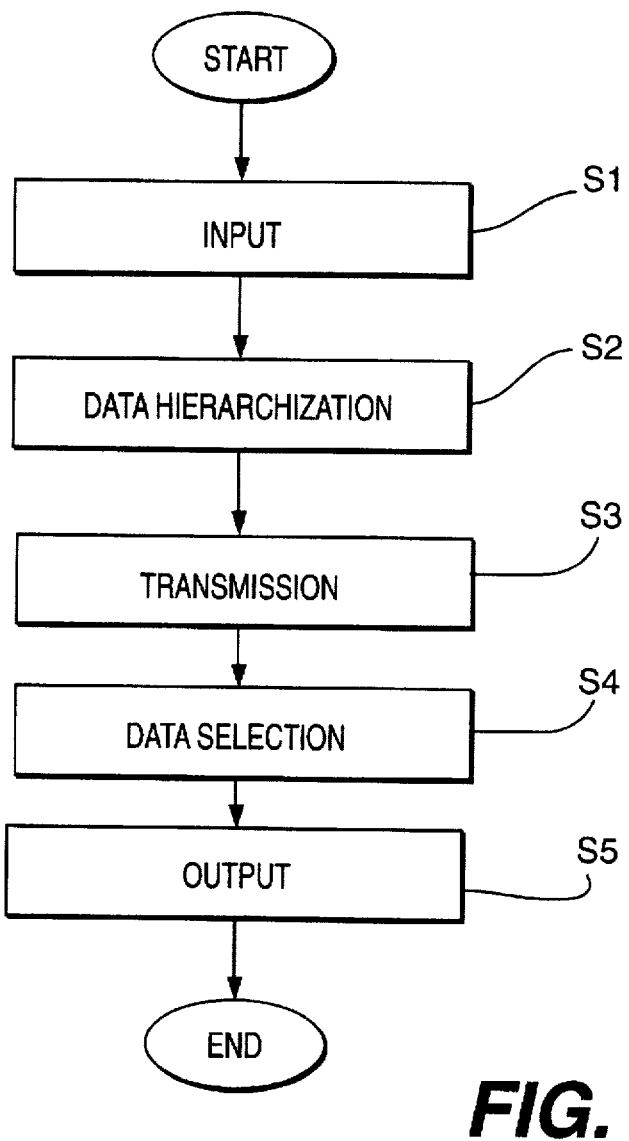
FIG. 2 is a flow chart illustrating operation of the image communication system shown in FIG. 1.

FIG. 2 illustrates operation of the image communication system described above with reference to FIG. 1. Referring to FIG. 2, in operation of the image communication system, the image input section 1 first performs an image inputting operation and sends out the inputted image as input image data 5 to the hierarchization section 2 at step S1. At step S2, the hierarchization section 2 processes the input image data 5 by hierarchization processing into communication data 6. It is to be noted that such hierarchization processing will be hereinafter described in detail. If data compression is required, coding is performed here by the hierarchization section 2. At step S3, the communication data 6 are transmitted from the hierarchization section 2 to the selection section 3 of the image reception apparatus 1020. At step S4, the selection section 3 selects only necessary data from the communication data 6 transmitted thereto and converts the necessary data into output image data 7. Since the communication data 6 are in a hierarchized condition then, such data as exceed the performance of the image output section 4 can be deleted here. At step S5, the image output section 4 visualizes the output image data 7 sent thereto from the selection section 3. Since data which cannot be visualized by the image output section 4 are not included in the output image data 7, the visualization can be performed without the necessity of any special image processing.

With the image communication system of the present invention described above, since data are hierarchized, the image reception apparatus can readily select only necessary ones of data transmitted thereto in accordance with the function thereof. Accordingly, the image reception apparatus does not require image conversion processing which is originally unnecessary with the image reception apparatus. Further, the image reception apparatus need not perform reception or conversion into output data of any data component which exceeds the performance of the image output section thereof. Consequently, the following advantages can be achieved.

1. The transmission side apparatus need not know of performances of the reception side apparatus (including the color/resolution conversion processing function). Accordingly, negotiations before data transmission are unnecessary.

2. When it is intended to transmit a same image to a plurality of image reception apparatus, since negotiations are not necessary, data which can be outputted from any kind of image reception apparatus presumable on the image transmission side apparatus can be transmitted by outputting same data only once.

3. The image reception apparatus can readily discriminate necessary data from data transmitted thereto using attribute data in accordance with the performance of the image output section thereof. Only the necessary data can be selected in accordance with the discrimination.

As a result, higher speed reception processing, simplification of the image reception apparatus (deletion of the color/resolution conversion apparatus and so forth), and reduction of the communication time (when communication disconnection from the image reception apparatus is considered) can be achieved.

In the following, two embodiments of the present invention in which 1. hierarchization for color components and
2. hierarchization for resolutions are performed using attribute data and coding and decoding are performed will be described.

First Embodiment

In an image communication system of the first embodiment of the present invention, hierarchization is performed in terms of the color component of an input image.

Figure 3:
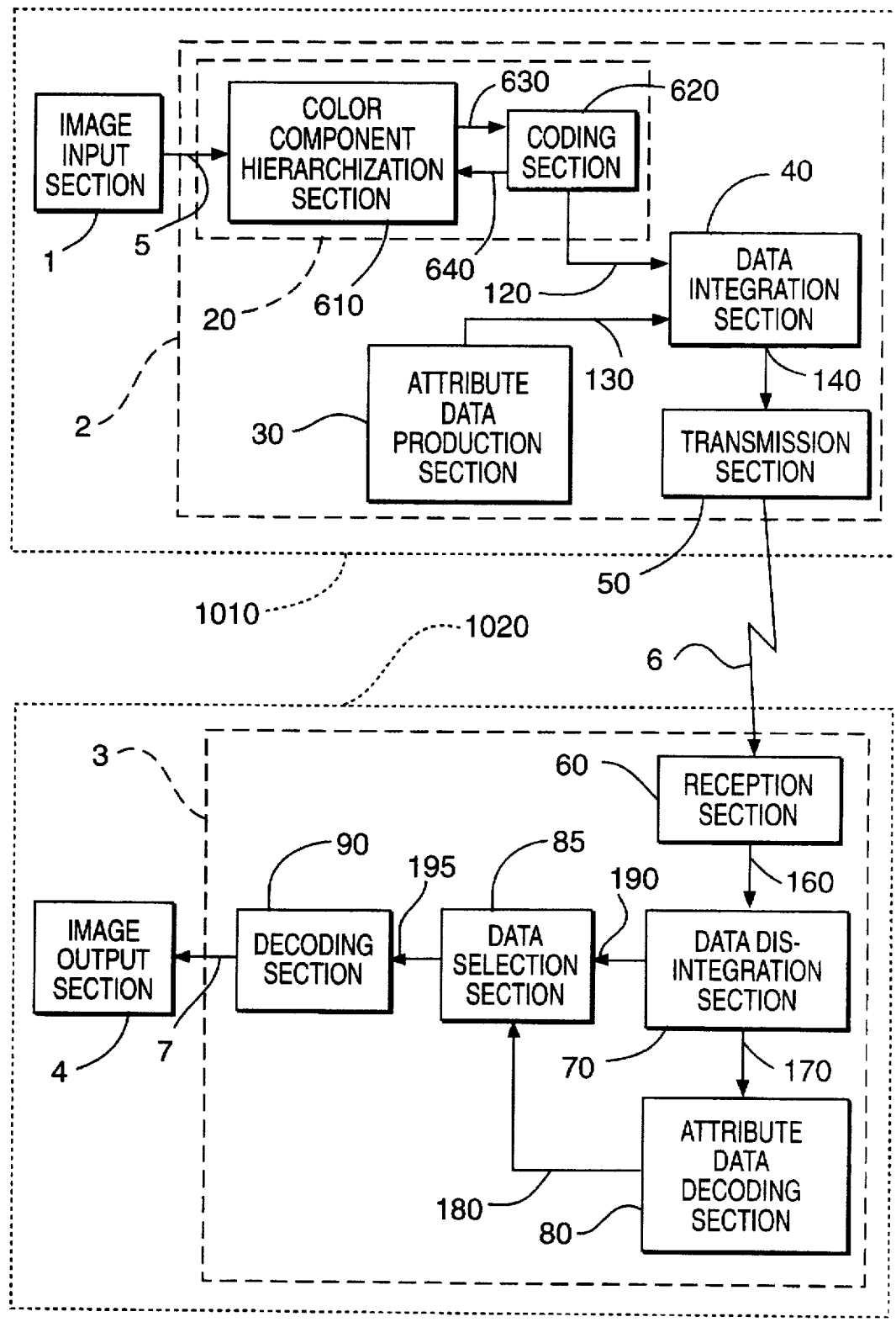
FIG. 3 is a block diagram of an image communication system showing a first preferred embodiment of the present invention.

Referring to FIG. 3, the image communication system of the first embodiment of the present invention is shown in block diagram. The image communication system shown includes an image transmission apparatus 1010 and an image reception apparatus 1020. The image transmission apparatus 1010 includes an image input section 1 and a hierarchization section 2. The hierarchization section 2 includes a hierarchic coding section 20, an attribute data production section 30, a data integration section 40, and a transmission section 50. The hierarchic coding section 20 includes a color component hierarchization section 610 and a coding section 620. Meanwhile, the image reception apparatus 1020 includes a selection section 3 and an image output section 4. The selection section 3 includes a reception section 60, a data disintegration section 70, an attribute data decoding section 80, a data selection section 85, and a decoding section 90. It is to be noted that each of reference numerals 120 and 190 denotes hierarchic code data, reference numeral 140 denotes transmission data, 160 reception data, 170 attribute data, 180 a control parameter or parameters, 195 selection code data, 630 hierarchic image data, and 640 a control signal.

In the image transmission apparatus 1010, the image input section 1 reads and converts an image of an input original document into input image data 5 and sends out the input image data 5 to the hierarchic coding section 20 of the hierarchization section 2.

In the image reception apparatus 1020, the color component hierarchization section 610 performs predetermined hierarchization in terms of the color component of the input image data 5 inputted thereto from the image input section 1 and sends out resulted hierarchic image data 630 to the coding section 620. The timing of the sending out operation is controlled by a control signal 640 from the coding section 620. The coding section 620 processes the hierarchic image data 630 by coding processing and sends out a result of the coding processing as hierarchic code data 120 to the data integration section 40. The attribute data production section 30 produces attribute data 130 in accordance with the input image data and the coding method and sends out the attribute data 130 to the data integration section 40. The data integration section 40 integrates the hierarchic code data 120 and the attribute data 130 to produce transmission data 140 and sends out the transmission data 140 to the transmission section 50. The transmission section 50 converts the transmission data 140 into communication data 6 and transmits the communication data 6 to the reception section 60 of the image reception apparatus 1020.

In the image reception apparatus 1020, the reception section 60 in the selection section 3 receives and converts the communication data 6 into reception data 160 and sends out the reception data 160 to the data disintegration section 70. The data disintegration section 70 disintegrates the reception data 160 into hierarchized code data 190 and attribute data 170 and sends out the hierarchized code data 190 and the attribute data 170 to the data selection section 85 and the attribute data decoding section 80, respectively. The attribute data decoding section 80 converts the attribute data 170 into control parameters 180 and sends out the control parameters 180 to the data selection section 85. The data selection section 85 selects, in accordance with the control parameters 180 received from the attribute data decoding section 80, only necessary code data of the hierarchized code data 190 sent thereto from the data disintegration section 70 and sends out the selected necessary data as selection code data 195 to the decoding section 90. The decoding section 90 decodes the selection code data 195 into output image data 7 and sends out the output image data 7 to the image output section 4.

The image output section 4 thus receives the output image data 7 from the decoding section 90 and visualizes the output image data 7 into an output image using a recording apparatus such as a printer or a display unit.

The attribute data production section 30 and the attribute data decoding section 80 of the image communication system described above are each provided for discriminating a hierarchization technique for communication data and are not required where a hierarchization technique is settled in advance. Meanwhile, the coding section 620 and the decoding section 90 are provided for compression or encipherment and decompression or decipherment of communication data and may be omitted if not necessary.

Operation of the image communication system of the first embodiment will be described subsequently with reference to FIGS. 4(a) and 4(b).

Figure 4A:
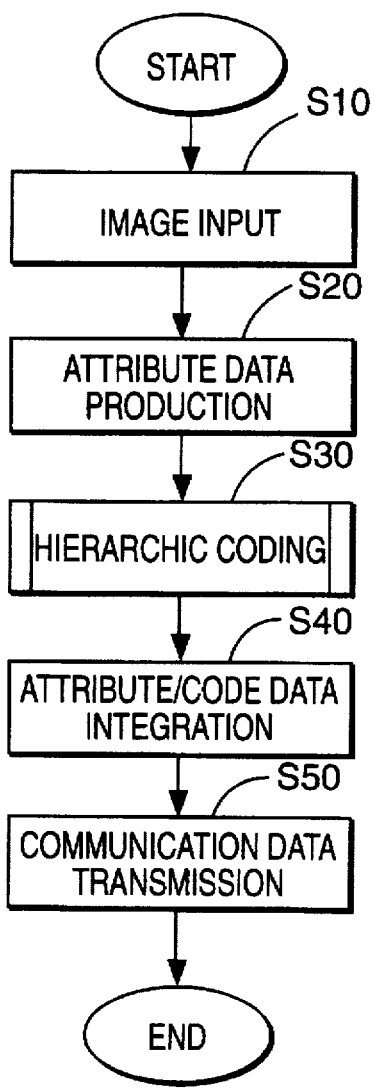
FIGS. 4(a) and 4(b) are flow charts illustrating operation of the transmission side apparatus and the reception side apparatus, respectively, of the image communication system shown in FIG. 3.

Referring first to FIG. 4(a), operation of the image transmission apparatus 1010 of the image communication system is illustrated. First at step S10, the image input section 1 performs an image inputting operation. The image input section 1 converts the thus inputted image into input image data 5 and sends out the input image data 5 to the hierarchic coding section 20. At step S20, the attribute data production section 30 produces and sends out attribute data 130 to the data integration section 40. Details of the attribute data 130 will be hereinafter described. At step S30, the hierarchic coding section 20 processes the input image data 5 by hierarchic coding processing and sends out a result of the processing as hierarchic code data 120 to the data integration section 40. Details of the hierarchic coding processing at step S30 and the hierarchic code data 120 will be hereinafter described. At step S40, the data integration section 40 integrates the attribute data 130 and the hierarchic code data 120 with each other to produce transmission data 140 and sends out the transmission data 140 to the transmission section 50. At step S50, the transmission section 50 converts the transmission data 140 into communication data 6 and transmits the communication data 6 to the reception section 60 of the image reception apparatus 1020.

Figure 4B:
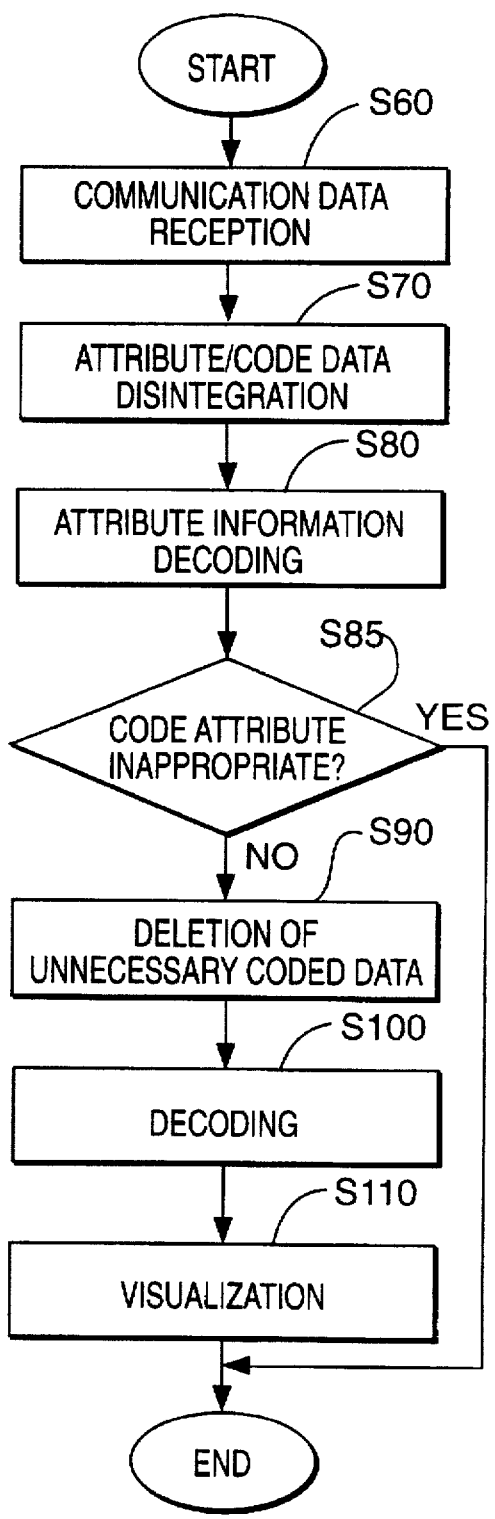

Referring now to FIG. 4(b), operation of the image reception apparatus 1020 shown in FIG. 3 is illustrated. At step S60, the reception section 60 receives the communication data 6 from the image transmission apparatus 1010, converts the communication data 6 into reception data 160, and sends out the reception data 160 to the data disintegration section 70. At step S70, the data disintegration section 70 disintegrates the reception data 160 into attribute data 170 and hierarchized code data 190 and sends out the attribute data 170 and the hierarchized code data 190 to the attribute data decoding section 80 and the data selection section 85, respectively. At step S80, the attribute data decoding section 80 produces control parameters 180 from the attribute data 170 and sends out the control parameters 180 to the data selection section 85. At step S85, the attribute data decoding section 80 refers to the code attribute and ends the reception processing when it determines that decoding of the image data is impossible. At step S90, the data selection section 85 selects those code data corresponding to image data necessitated by the image output section 4 and sends out the selected code data as selection code data 195 to the decoding section 90. At step S100, the decoding section 90 decodes the selection code data 195 received from the data selection section 85 into output image data 7 and sends out the output image data 7 to the image output section 4. At step S110, the image output section 4 receives the output image data 7 and performs visualization of the output image data 7 into an output image using a recording apparatus such as a printer or a display unit.

Figures 5, 6:
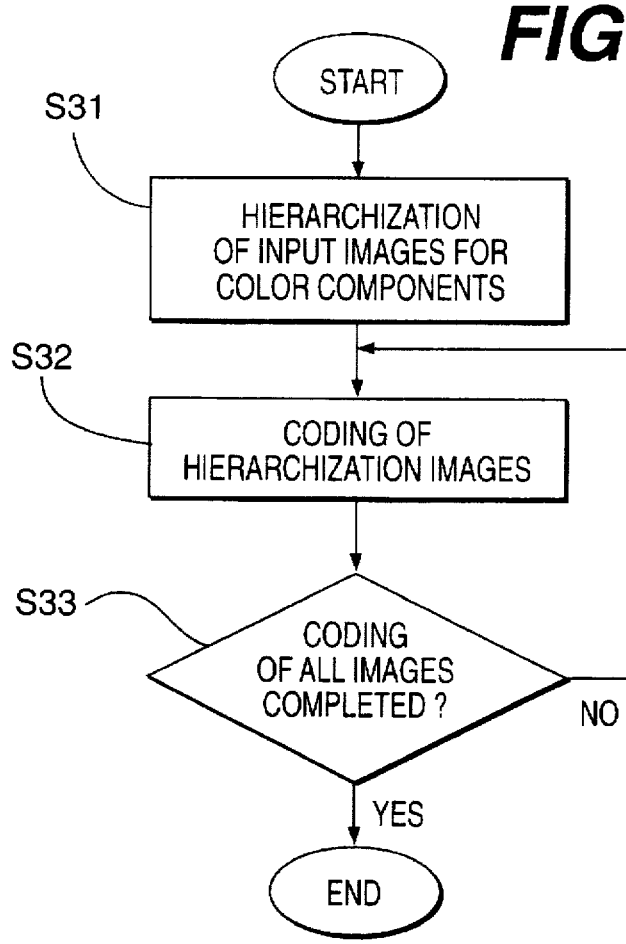
FIG. 5 is a flow chart illustrating details of operation at a step in the flow chart of FIG. 4(a)
FIG. 6 is a table illustrating attribute data employed in the image communication system shown in FIG. 3.

FIG. 5 illustrates details of the processing at step S30 in FIG. 4(a). Referring to FIG. 5, at step S31, the color component hierarchization section 610 performs predetermined image hierarchization. At step S32, the coding section 620 codes the hierarchic image data 630 sent thereto from the color component hierarchization section 610 into hierarchic code data 120 and sends out the hierarchic code data 120 to the data integration section 40. At step S33, the color component hierarchization section 610 discriminates whether or not there remains a hierarchic image for which coding processing has not been performed as yet. If such hierarchic image remains, the control sequence returns to step S32, but if no such hierarchic image remains, then the processing at step S30 is completed.

FIG. 6 illustrates an example of attribute data produced at step S20 in FIG. 4(a). Each of the attribute data described above is constituted from several items and contents of such items. In the example illustrated in FIG. 6, "coding technique", "resolution", "interleave", "used color", "color space" and so forth are shown as the items, and "JPEG (Joint Photograph Expert Group) hierarchical" which is one of color facsimile standards is set for the "coding technique"; "400[dpi] (dot per inch)" is set for the "resolution"; "component" is set for the "interleave"; "full colors" is set for the "used color"; and "L*a*b*" is set for the "color space". It is to be noted that "interleave" indicates in what manner color components of red, green and blue are transmitted, and "component" signifies that, in the case of the L*a*b* color space, L* components, a* components and b* components are transmitted for individual picture elements, but in the case of the RGB color space, color components of red, green and blue are transmitted for individual picture elements. Details of the JPEG hierarchical system will be hereinafter described.

Each attribute data may include any other item than those mentioned above such as, for example, an item of a characteristic with which the possibility of visualization of the image output section of the image reception apparatus side is determined or another item of a characteristic of code data with which the possibility of decoding by the decoding section is determined.

Figure 7A:
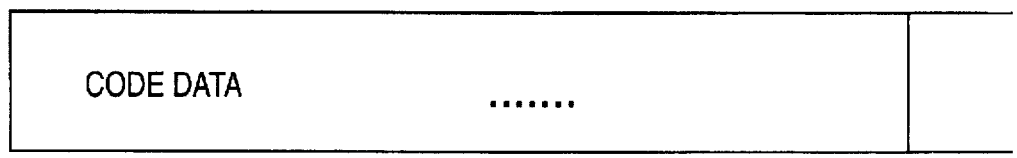
FIGS. 7(a) to 7(d) are diagrammatic views illustrating code data when hierarchization of code data in terms of the color component is performed in the image communication system shown in FIG. 3.

FIGS. 7(a) to 7(d) illustrate several examples of code data 120 produced at step S30 in FIG. 5. If ordinary coding processing is performed, then the code data produced have such a continuous form as illustrated in FIG. 7(a), and accordingly, it is impossible to extract a particular image component from the code data without decoding processing.

Figure 7B:
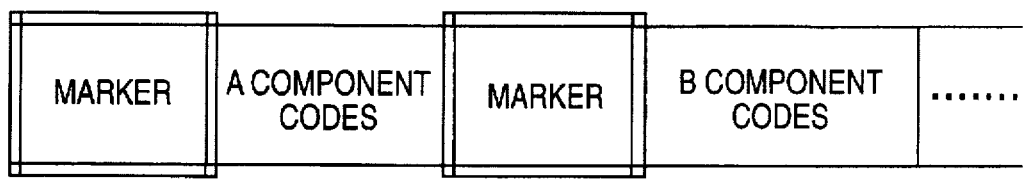

FIG. 7(b) illustrates another example of the code data 120 obtained by performing coding for individual color components with different hierarchical codes provided to the individual color components and with a marker applied as separation data corresponding to each color component. In this instance, since codes corresponding to different components of an image are delineated by a marker, the individual color components can be identified without decoding processing by detecting the marker by means of the data disintegration section 70. Accordingly, where the image reception apparatus includes a mere black-and-white image output section, if a particular component such as a brightness component, for example, an L component of the L*a*b* color space, is coded as an independent component in advance, then only codes of the particular component can be decoded and outputted as a black-and-white image. In this instance, since unnecessary components need not be decoded, a color conversion section or a memory which is originally unnecessary need not be provided additionally to the black-and-white image reception apparatus. Further, if necessary data are prepared intermediately of a code data train being transmitted, then succeeding data need not be received or processed by code data/attribute data disintegration processing any more.

An effect of such deletion of data will be described. It is assumed that an image is composed of three components A, B and C and only the component A is required for a black-and-white image. The data amounts of the three components are represented by DA, DB and DC. Further, the data amounts of markers of the individual components are represented by MA, MB and MC. The data amounts mentioned above can each be represented as a non-negative integral number. In an ordinary transmission system, data of the amount given by

DA+DB+DC must be received/decoded whether the image output section of the image reception apparatus outputs a black-and-white image or a color image. On the other hand, where the image output section of the image reception apparatus outputs a black-and-white image, in the case of the image communication system of the present embodiment, if the component A is sent first, then data of the data given by

MA+DA may be received/decoded. Since generally MA<<DA, the ratio R in efficiency between the conventional image communication system and the image communication system of the present embodiment is defined as $$R=DA/(DA+DB+DC)$$

If it is assumed that the data amounts of the different components are substantially equal to one another, then the total amount of data as an object for decoding in the image communication system of the present embodiment is substantially equal to one third that in the conventional image communication system. Also where the image output section of the image reception apparatus outputs a color image, the amount of data to be received/decoded is given by $$MA+DA+MB+DB+MC+DC=DA+DB+DC$$

and the ratio R in efficiency is substantially equal to 1. Accordingly, little overhead is involved.

Figure 7C:
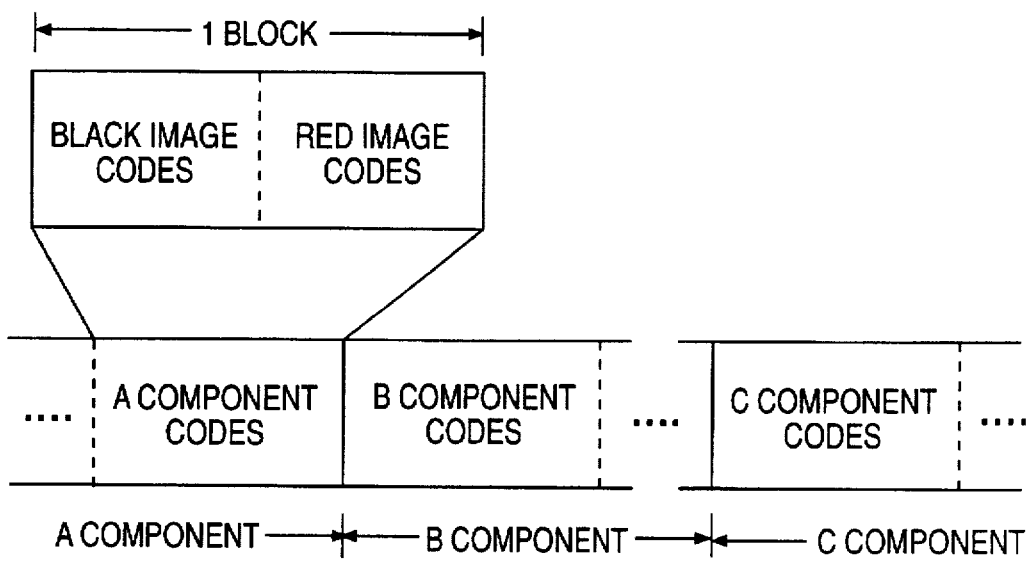

The color components then may be different from color components in an ordinary color space and may be provided for different colors. For example, if the colors are divided, for example, into black, red and the other colors, then an image output section which can print in two colors of black and red can be used. In this instance, if such a code construction wherein a block is constituted from a pair of a black image code and a red image code as seen from FIG. 7(c) is employed, then a frame memory for composing black and red is not required and at least a memory for one block shown in FIG. 7(c) suffices. It is to be noted that, for such a code construction which does not include a marker as seen from FIG. 7(c), for example, such a technique that a code length of each component is described at the top of codes as seen from FIG. 8 or a fixed length coding technique is adopted may be employed. It can be seen in the example illustrated in FIG. 8 that, at the top of code data, code data of the component A having the resolution of 100 dpi are present; code data of the component A having the resolution of 200 dpi are present from the 100th byte from the top; code data of the component A having the resolution of 400 dpi are present from the 300th byte from the top; and code data of the component B having the resolution of 100 dpi are present from the 700th byte from the top.

Meanwhile, although it seems that hierarchization in terms of the color component increases the size of the entire code data, the possible drawback can be improved by a construction which eliminates overlapping of data of different components.

Figure 7D:
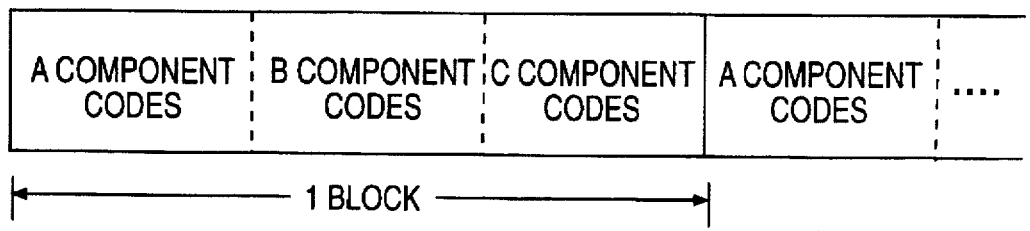

FIG. 7(d) illustrates an example of the code data 120 wherein data of different components are arranged in different blocks. In this instance, since particular components are not concentrated, reduction of the communication time cannot be achieved. Further, where the length of one block is small, such a method that a marker is applied or a code length of each block is described at the top of code data will increase the entire code length. Accordingly, the example illustrated in FIG. 7(d) is not practical in use. This problem can be solved if the fixed length coding method is employed. Meanwhile, even for the variable length coding technique, such a countermeasure as to delete a particular component or components while decoding proceeds may be employed in order to reduce the communication time.

The following advantages can be achieved with the image communication system of the first embodiment of the present invention.

The overhead of decoding an image of a color component or components which cannot be outputted on the reception side can be deleted. As a result, an increase of the speed of the image outputting processing can be achieved.

Reduction of the communication time can be achieved where communications can be disconnected on the reception side.

Simplification of the color conversion processing section on the reception side can be achieved. When non-hierarchized codes are used, a color conversion processing section for conversion from a full color image into an image of a color space of the reception side itself is required. On the other hand, with the image communication system of the present embodiment of the invention, the reception side need not include such color conversion processing section which is originally unnecessary.

Second Embodiment

Here, an image communication system wherein hierarchization is performed in terms of the resolution of an input image will be described as the second preferred embodiment of the present invention.

Figure 9:
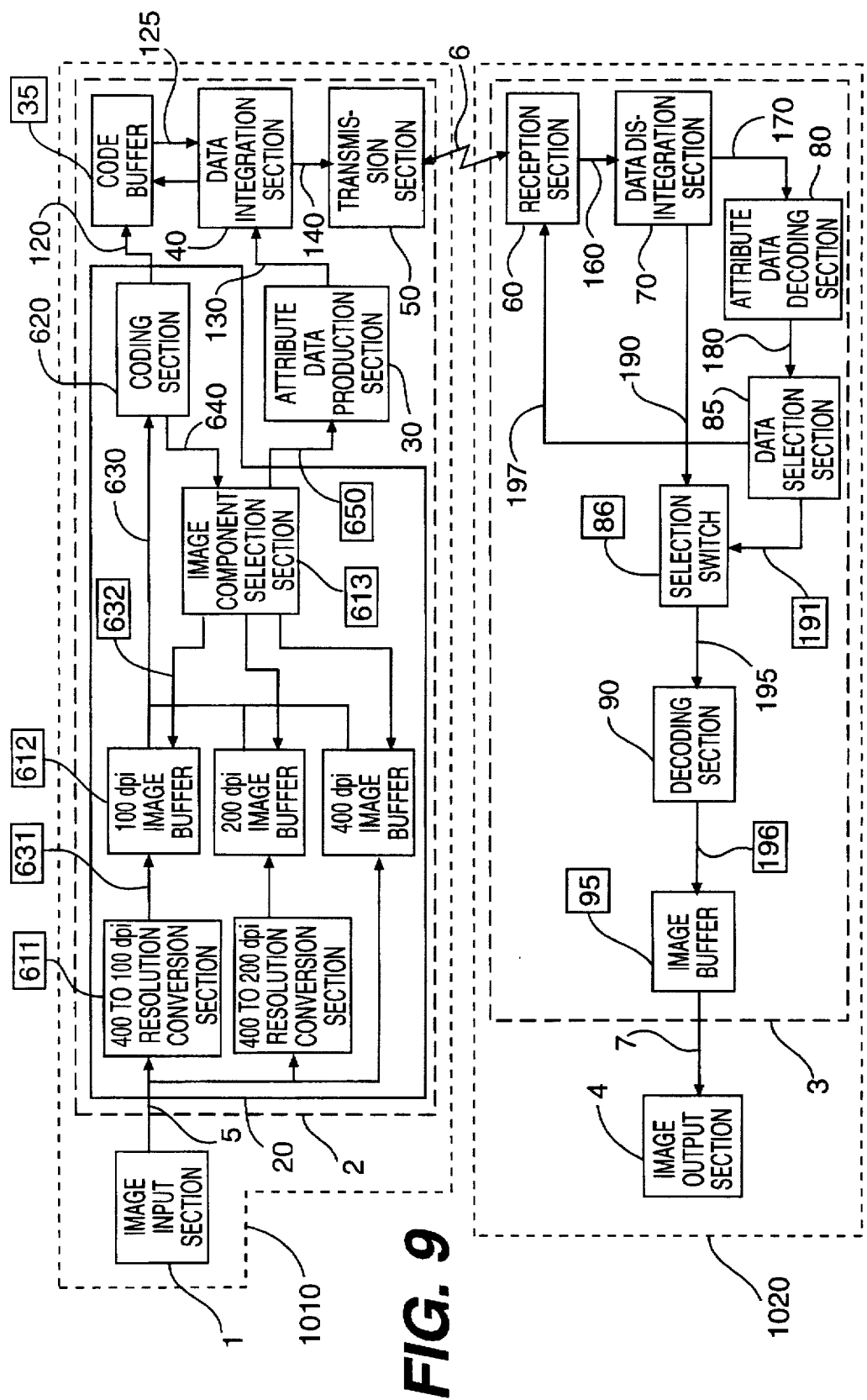
FIG. 9 is a block diagram of another image communication system showing a second preferred embodiment of the present invention.

FIG. 9 shows the image communication system of the second embodiment of the present invention. Referring to FIG. 9, the image communication system shown includes an image transmission apparatus 1010 and an image reception apparatus 1020. The image transmission apparatus 1010 includes an image input section 1 and a hierarchization section 2. The hierarchization section 2 includes a resolution hierarchization section 20, a code buffer 35 for storing hierarchized data produced by the resolution hierarchization section 20, an attribute data production section 30 for producing attribute data regarding the hierarchized data produced by the resolution hierarchization section 20, a data integration section 40 for integrating the hierarchized data of the code buffer 35 and the attribute data of the attribute data production section 30 with each other, and a transmission section 50 for transmitting the integration data of the data integration section 40. The transmission section 50 includes communication ending means for compulsorily ending the transmission of the transmission section 50 in accordance with a communication ending protocol which will be hereinafter described.

The resolution hierarchization section 20 extracts, from image data inputted from the image input section 1, a plurality of image data of different kinds in terms of the attribute which should be matched for communication with the image reception apparatus 1020, that is, the resolution here. In the resolution hierarchization section 20, image data of 400 dpi from the image input section 1 are converted into particular image data of 100 dpi and 200 dpi by a pair of resolution conversion section 611. The particular image data of 100 dpi and 200 dpi are stored, together with the image data of 400 dpi from the image input section 1, into corresponding image buffers 612. Thus, three kinds of particular image data of 100 dpi, 200 dpi and 400 dpi are obtained from the image buffers 612. Each particular image data 630 is coded by a coding section 620 and stored into the code buffer 35.

The coding section 620 supplies a preparation condition signal 640 to an image component selection section 613. The image component selection section 613 serves as storage control means and controls so that the particular image data 630 are selected in a particular order, preferably in an order from a smaller value in resolution and are supplied in the thus selected order to the coding section 620. The particular image data are coded in the selected order and successively stored into the code buffer 35. The data constituted from the particular image data linked successively into a single aggregate are referred to as hierarchized data.

Figures 8, 10:
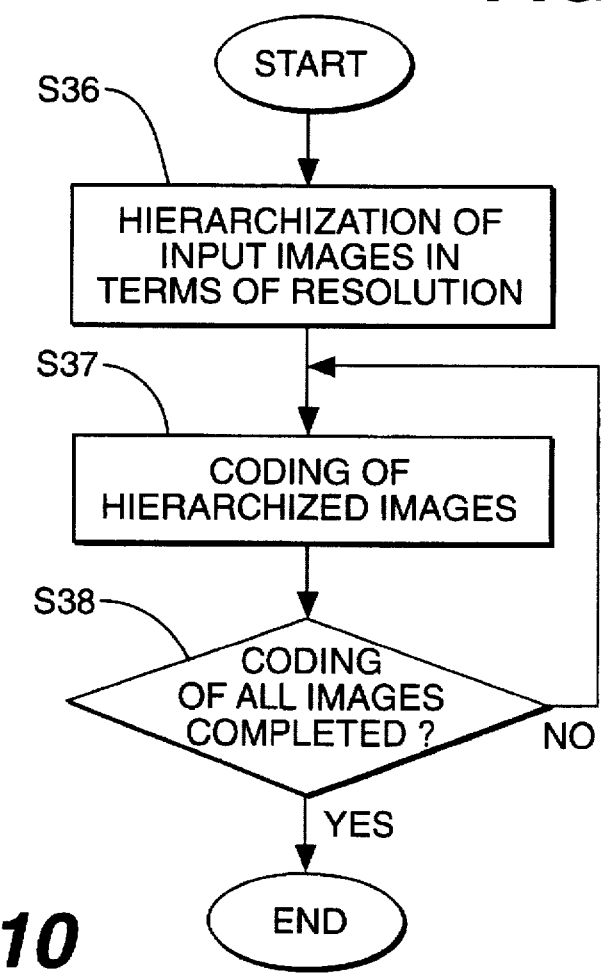
FIG. 8 is a table illustrating code data when hierarchization is performed in terms of the resolution in the image communication system shown in FIG. 3.
FIG. 10 is a flow chart illustrating operation of the image communication system shown in FIG. 9.

The order in which the particular image data 630 are selected by the image component selection section 613 is sent as a selection signal 650 to the attribute data production section 30. The attribute data production section 30 continuously gathers, or preferably hierarchically gathers, as shown in FIG. 8, the information that the particular image data have been selected in order of 100 dpi, 200 dpi and 400 dpi and the data amounts of the particular image data to produce attribute data 130. In other words, the attribute data includes, as contents thereof, information of the selection order of particular image data by the storage control means and information of stored positions of the particular image data in the storage means.

The hierarchization data 125 and the attribute data 130 are integrated with each other by the data integration section 40 and sent as integration data 140 to the transmission section 50.

Meanwhile, the image reception apparatus 1020 includes a selection section 3 and an image output section 4. The selection section 3 includes a reception section 60, a data disintegration section 70, an attribute data decoding section 80, a data selection section 85, a selection switch 86, a decoding section 90 and an image buffer 95. The reception section 60 receives and converts communication data 6 into reception data 160 and sends out the reception data 160 to the data disintegration section 70. The data disintegration section 70 disintegrates the reception data 160 into hierarchization code data 190 and attribute data 170 and sends out the hierarchization code data 190 and the attribute data 170 to the data selection section 85 and the attribute data decoding section 80, respectively. The attribute data decoding section 80 decodes the attribute data 170 to convert only information necessary for selection of code data into control parameters 180 and sends out the control parameters 180 to the data selection section 85. The data selection section 85 produces, based on the control parameters 180 received from the attribute data decoding section 80, a control signal 191 representative of whether or not the hierarchization code data 190 sent thereto from the data disintegration section 70 are necessitated and sends out the control signal 191 to the selection switch 86. The selection switch 86 sends out only those selection code data 195 necessary for decoding selected from the hierarchization code data 190 in accordance with the control signal 191 to the decoding section 90. The decoding section 90 decodes the selection code data 195 and sends out resulted data 196 to the image buffer 95. The image buffer 95 integrates the output image data 196 of the individual components successively sent thereto from the decoding section 90 to produce an output image, and when decoding of all of the components is completed, the decoding section 90 outputs the output images as output image data 7 to the image output section 4. When the data selection section 85 selects particular image data of a necessary resolution, a selection end signal 197 is supplied to the reception section 60 from the data selection section 85. The reception section 60 includes a protocol control apparatus for sending a communication ending signal to the image transmission apparatus 1010 owing to circumstances of the image reception apparatus 1020 side.

The image output section 4 receives output image data 7 from the image buffer 95 of the selection section 3 and visualizes the output image data 7 into an output image using a recording apparatus such as a printer or a display unit.

In broadcasting communications wherein a plurality of image reception apparatus 1020 are connected to a particular image transmission apparatus 1010, each of the image reception apparatus 1020 selectively utilizes those of communication data 6 necessitated by itself in accordance with attribute data.

Where the image output section 4 of the image reception apparatus 1020 is designed for the resolution of 100 dpi, when the data selection section 85 ends its selection of particular image data of 100 dpi, a selection end signal 197 is supplied to the reception section 60, and the protocol control apparatus of the reception section 60 generates a communication ending signal. The communication ending signal of the transmission section 50 of the hierarchization section 2 of the image transmission apparatus 1010 receives the communication ending signal and compulsorily ends the transmission of the transmission section 50.

The image communication system of the present embodiment operates in such a manner as illustrated in FIGS. 4(a), 4(b) and 10. Since the operation illustrated in FIGS. 4(a) and 4(b) is similar to that of the image communication system of the first embodiment described above, overlapping description thereof is omitted herein to avoid redundancy.

FIG. 10 illustrates detailed processes at step S30 of FIG. 4(a). Referring to FIG. 10, at step S36, the resolution hierarchization section 20 performs predetermined image hierarchization in accordance with a resolution of the image output section. The image hierarchization here is performed in order to allow deletion at the image reception apparatus side of any component which exceeds the performance of the image output section of the image reception apparatus. At step S37, the coding section 620 codes the hierarchic image data 630 sent thereto from any of the image buffers 612 and sends out resulted hierarchic code data 120 to the data integration section 40 by way of the code buffer 35. At step S38, it is discriminated whether or not there still remains a hierarchic image for which coding processing has not been performed by the resolution hierarchization section 20. If there still remains such image, then the control sequence advances to step S37, but on the contrary if coding of all images has been completed, the operation at step S30 is completed.

FIGS. 11(a) to 11(d) illustrate several examples of code data produced at step S30 in FIG. 10. Since the format of codes is similar to that in the first embodiment described hereinabove, overlapping description thereof is omitted herein to avoid redundancy, and a method of realizing the hierarchization in terms of the resolution will be described here.

Figures 11A, 11B, 11C, 11D:
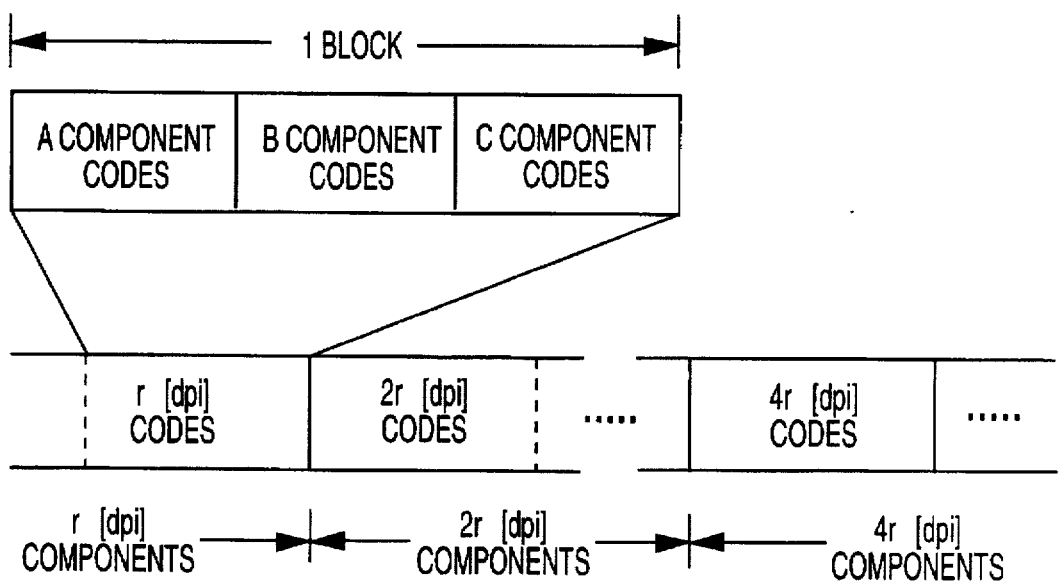
FIGS. 11(a) to 11(d) are diagrammatic views of code data used in the image communication system shown in FIG. 9.
Figure 12:
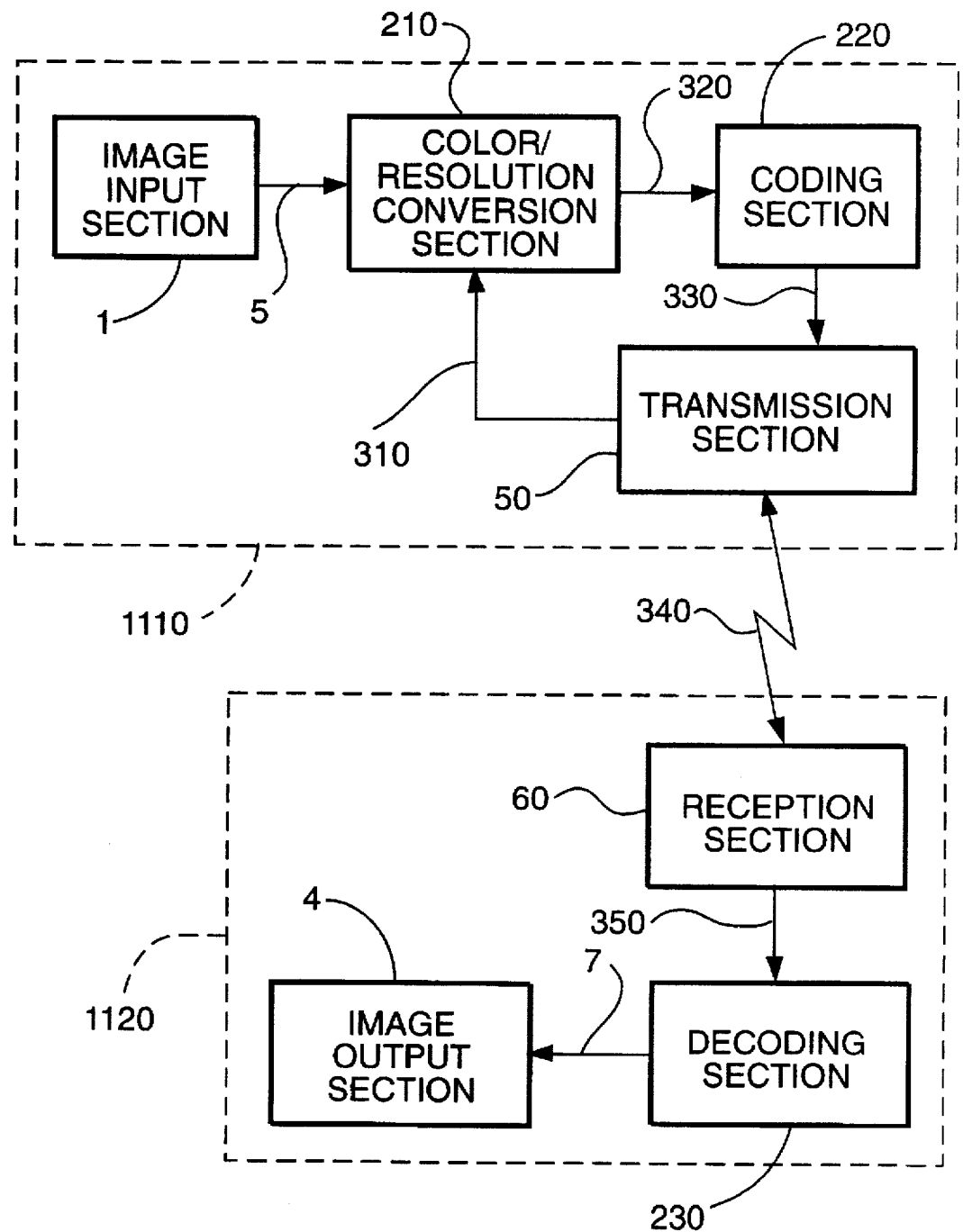
FIG. 12 is a block diagram showing an exemplary construction of a conventional image communication system.
Figure 13A:
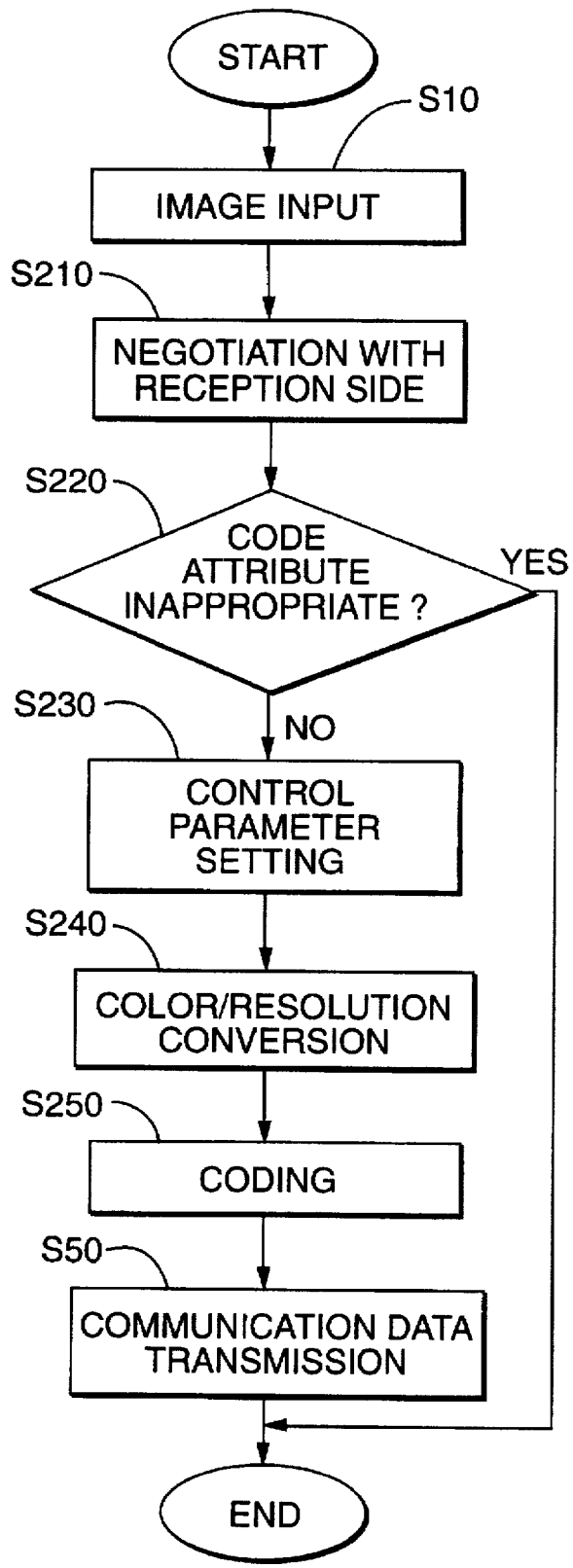
FIGS. 13(a) and 13(b) are flow charts illustrating operation of the transmission side apparatus and the reception side apparatus, respectively, of the conventional image communication system shown in FIG. 12.
Figure 13B:
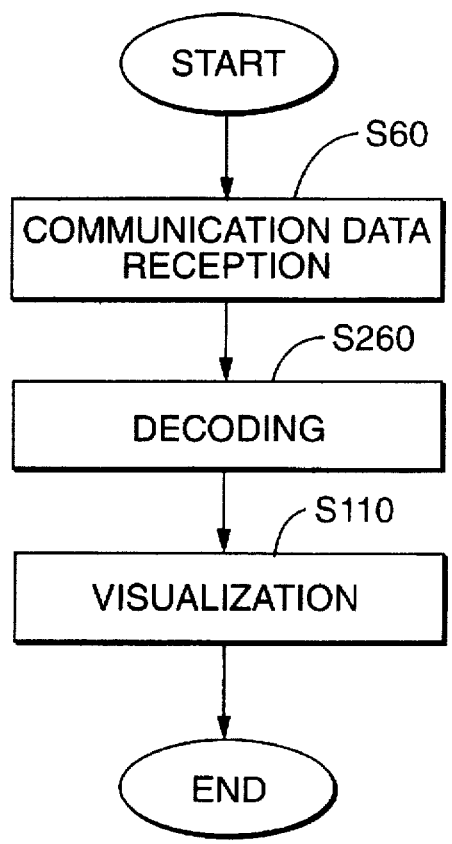
Figure 15:
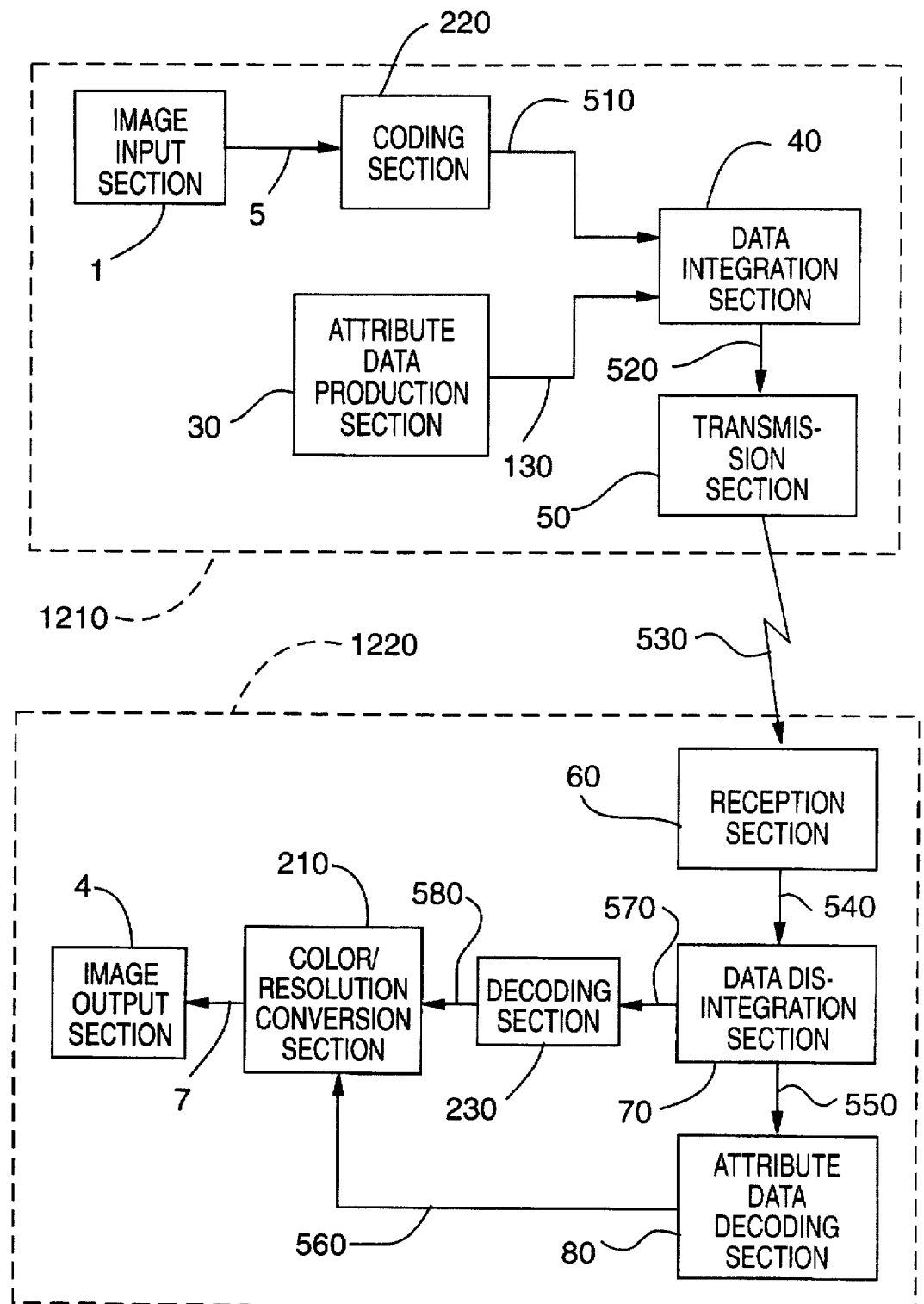
FIG. 15 is a block diagram showing an exemplary construction of another conventional image communication system.
Figure 16A:
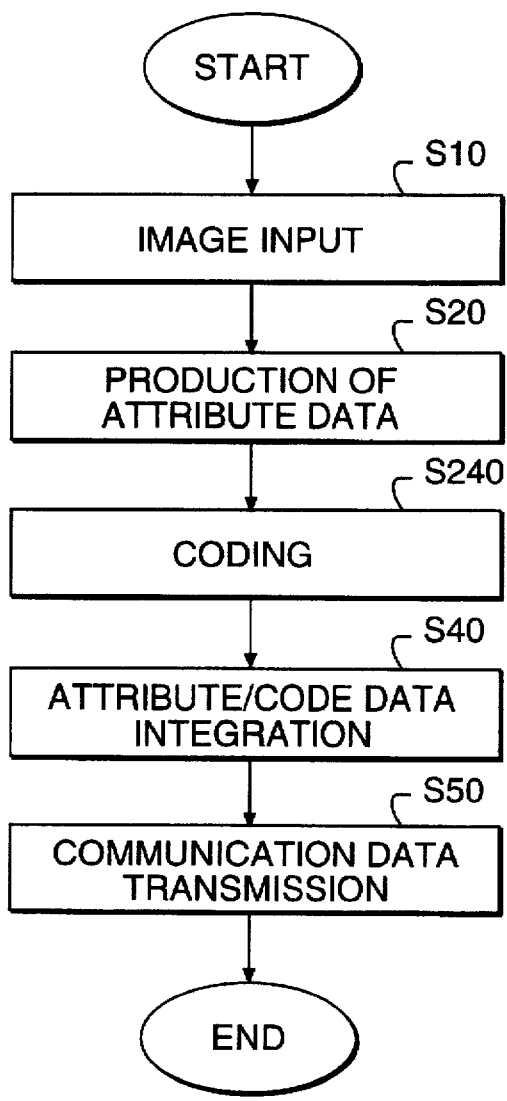
FIGS. 16(a) and 16(b) are flow charts illustrating operation of the transmission side apparatus and the reception side apparatus, respectively, of the conventional image communication system shown in FIG. 15.
Figure 16B:
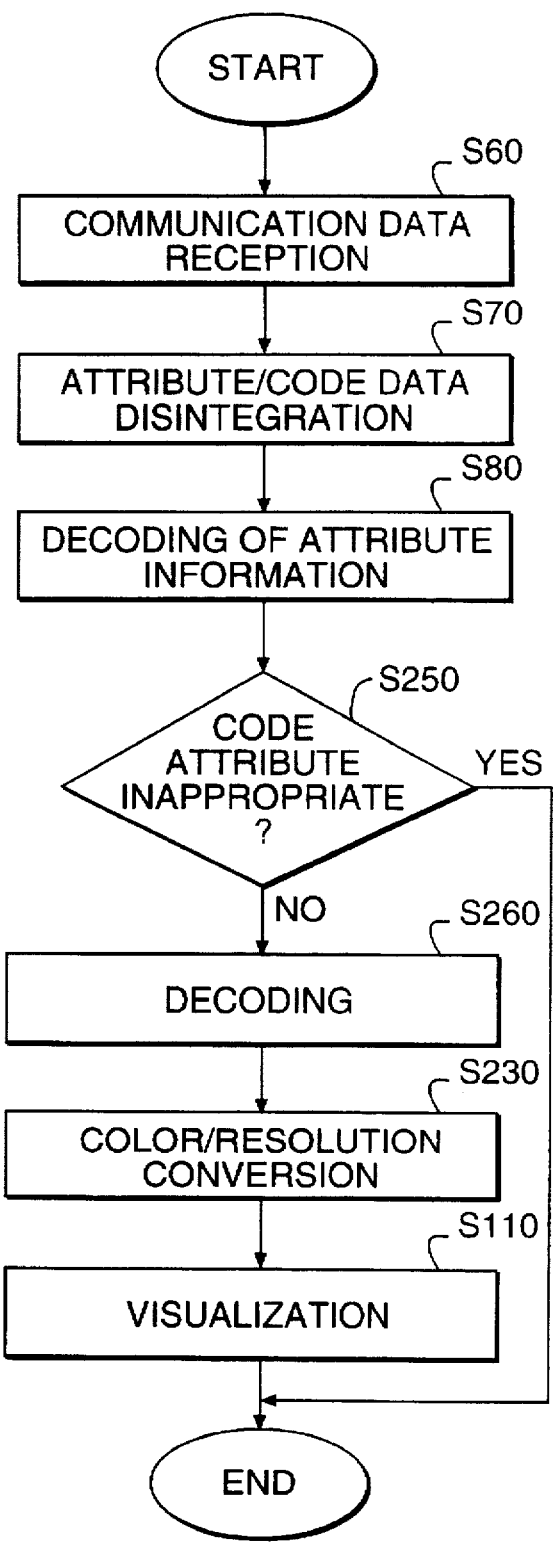

FIG. 11(a) shows an example of hierarchized codes in terms of the resolution obtained by performing coding for resolutions in terms of a factor of an exponentiation of two to obtain hierarchic codes in terms of the resolution, and such hierarchized codes can be realized by application of, for example, hierarchical codes. Here, the hierarchical code denotes such a technique as disclosed, for example, in "Digital Compression And Coding Of Continuous-tone Still Images", CCITT Recommendation T.81, p.J-1 and will be hereinafter used in this means. This is a technique wherein a reduced image of an object image is produced to perform coding/decoding processing. In the code construction, code data obtained by coding an image of a lowest resolution, for example, r [dpi] are stored first. Then, code data obtained by coding difference images between images of the twice resolution, that is, 2r [dpi] and images obtained by enlarging the images of r [dpi] to twice in the vertical and horizontal directions are stored. Data of higher resolutions are successively added in this manner. It is to be noted that, in the example illustrated in FIG. 11(a), the "2r [dpi] codes" may signify the data themselves obtained by coding the images of 2r [dpi] or difference data for obtaining images of 2r [dpi] from the r [dpi] codes.

It is to be noted that, in the second embodiment of the present invention, higher resolution components need not necessarily be difference images as different from hierarchical codes. Where difference images are not employed, since images are set as they are, the coding efficiency is low, but there is an advantage in that the coding section and the decoding section can be simplified in construction.

FIG. 11(b) illustrates an example of a result of application of the hierarchization illustrated in FIG. 11(a). In the example illustrated in FIG. 11(b), hierarchization based on the resolution is performed in terms of an arbitrary magnification other than a factor of an exponentiation of two. In ordinary hierarchical coding, the hierarchization of resolutions is limited to a factor of an exponentiation of two taking the coding efficiency and an application to display and so forth into consideration. However, in the present invention, since it is the utmost object to allow adaptation to various resolutions, the coding efficiency may be sacrificed to some degree. Accordingly, all presumable resolutions may be supported.

FIG. 11(c) illustrates an example of codes obtained by coding for different frequencies and hierarchized in terms of the resolution. Frequency components which can be visualized are limited with an image output apparatus of a low resolution. Accordingly, hierarchization in terms of a frequency component allows selection of codes by the image reception apparatus side. In coding which employs such a technique as a sub band code, since coding is performed after an image is separated into frequency components, such hierarchization as mentioned just above can be realized simply. Also in such a method wherein parameters are coded for different frequencies such as DCT (discrete cosine transform), higher frequency components than a predetermined level are not required for visualization, and accordingly, selective decoding can be performed.

FIG. 11(d) illustrates an example of codes which are obtained, in combination with the first embodiment, by hierarchizing codes in terms of both of the color component and the resolution.

The following advantages can be achieved with the image communication system according to the second embodiment of the present invention.

The overhead of decoding an image of color components which cannot be outputted on the reception side can be deleted. As a result, an increase of the speed of image outputting processing can be anticipated.

Reduction of the communication time can be achieved where communication can be interconnected on the reception side.

The resolution conversion processing section of the reception side is not required any more, and simplification of the image reception apparatus can be achieved.

A conventional facsimile which does not include a resolution conversion processing section can be modified so as to allow communication with another facsimile having a different performance by such simple improvement as additional provision of an attribute data decoding section and a data selection section.

Having now fully described the invention, it will be apparent to one of ordinary skill in the art that many changes and modifications can be made thereto without departing from the spirit and scope of the invention as set forth herein.

What is claimed is:

1. An image communication system, comprising:

a transmission apparatus for transmitting an image inputted thereto as image data; and a plurality of reception apparatuses, each of which includes image data input means for receiving the transmitted image data and image output means for outputting the received image data as the image;

said transmission apparatus including:

image input means for receiving an image;

attribute data production means for producing plural sets of attribute data each of which represents the attribute of one of the plural sets of image data and corresponds to one of the capabilities of said image output means;

hierarchization means for performing hierarchization of the input image by producing plural sets of image data from the input image, each of the plural sets of image data being coded for different attributes corresponding to different capabilities of said image output means; and means for transmitting the plural sets of image data to said plurality of reception apparatuses at the same time without negotiation, said transmitting means including means for transmitting the plural sets of attribute data with the plural sets of image data;

each of said reception apparatuses further including selection means for selecting at least one set of image data from the transmitted plural sets of image data in accordance with the capability of said image output means, said reception apparatuses further including attribute data decoding means for decoding the attribute data produced by said attribute data production means; and said selection means including means for selecting at least one set of image data in accordance with the decoded attribute data.

2. An image communication system according to claim 1, wherein said transmission apparatus further includes coding means for coding an image inputted thereto from said image input means, and said plurality of reception apparatuses include decoding means for decoding code data produced by said coding means and transmitted thereto from said transmission apparatus.

3. An image communication system according to claim 1, wherein said hierarchization means includes color component hierarchization means for hierarchizing the input image in terms of the color component.

4. An image communication system according to claim 1, wherein said hierarchization means includes resolution hierarchization means for hierarchizing the input image in terms of the resolution.

* * * * *